H. K. HARDCASTLE.
TURN TABLE.
APPLICATION FILED OCT. 6, 1915.
1,183,191. Patented May 16, 1916.
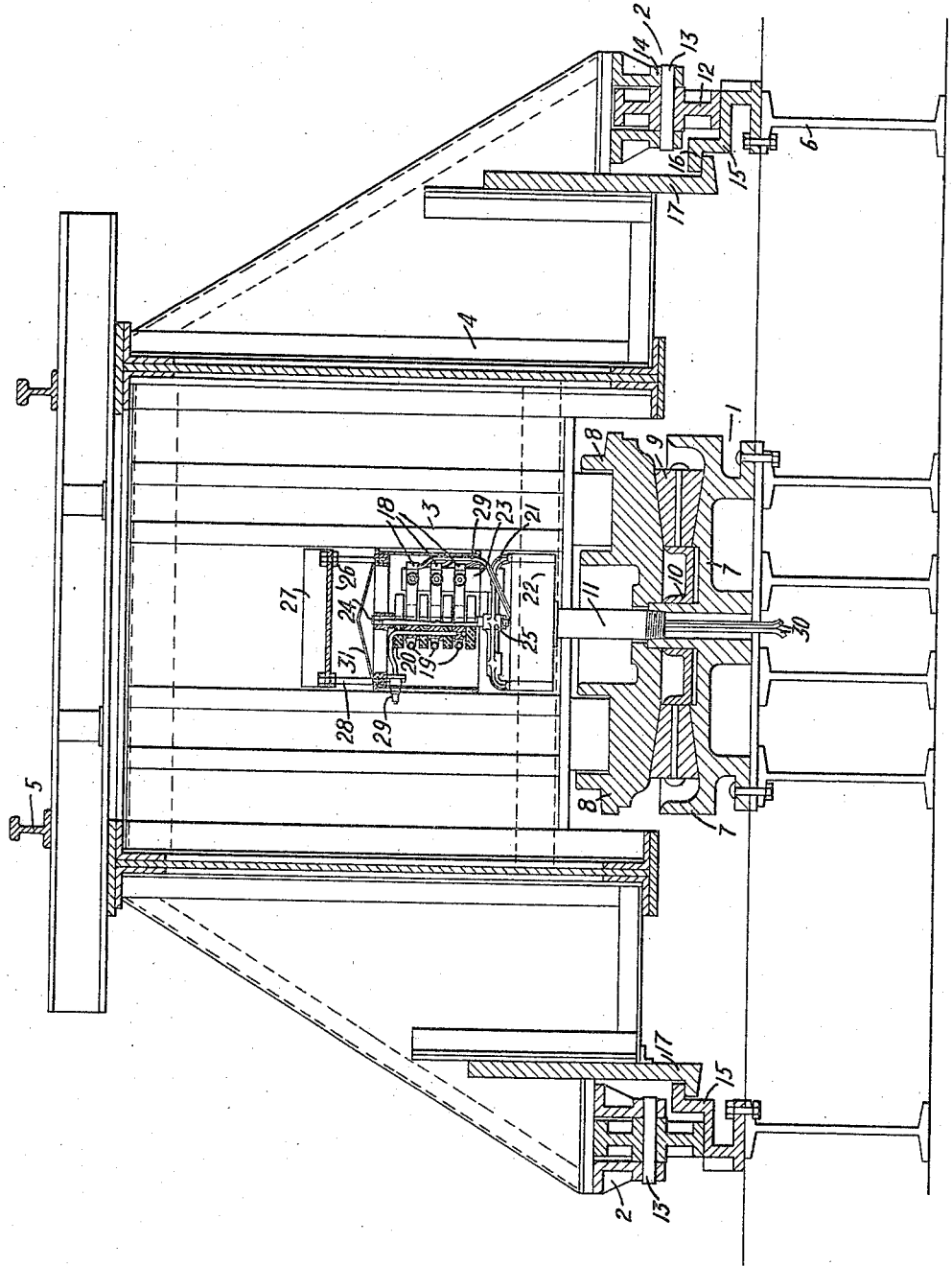
WITNESSES:
Fred A. Lind.
Wayne B. Wells
INVENTOR
Henry K. Hardcastle
BY
Wesley S. Carr
ATTORNEY

UNITED STATES PATENT OFFICE.

HENRY K. HARDCASTLE, OF WILKINSBURG, PENNSYLVANIA, ASSIGNOR TO WESTING-HOUSE ELECTRIC AND MANUFACTURING COMPANY, A CORPORATION OF PENNSYLVANIA.

TURN-TABLE.

1,183,191. Specification of Letters Patent. Patented May 16, 1916.

Application filed October 6, 1915. Serial No. 54,347.

*To all whom it may concern:*

Be it known that I, HENRY K. HARDCASTLE, a citizen of the United States, and a resident of Wilkinsburg, in the county of Allegheny and State of Pennsylvania, have invented a new and useful Improvement in Turn-Tables, of which the following is a specification.

My invention relates to turn-tables for locomotives and other vehicles and particularly to turn-tables which are electrically operated.

One object of my invention is to provide a turn-table having a covered current-collector which is located within the body of the turn-table and is mounted upon the center bearing thereof.

A further object of my invention is to provide a turn-table with a current-connector which is located substantially at its center of rotation, whereby the supply leads may be disposed through an axial opening in the center bearing and whereby the size and expense of the current-collecting device may be relatively small.

In an electrically operated turn-table of usual construction, the current-collector is mounted upon a frame supported at the center of the turn-table and extends over its top and over the locomotive to be moved, thus exposing the current-collector to the weather and rendering it inaccessible for inspection, lubrication and repairs.

According to my invention, the current-collector is located within the turn-table and is so mounted upon the center bearing as to be protected from the weather and to be rendered easily accessible for repairs.

The single figure of the accompanying drawing is a view, partially in section and partially in end elevation, of a turn-table embodying my invention, the section being taken through the center of the turntable.

Referring to the drawing, a turn-table is provided with a center bearing 1, a balancing bearing 2, a current-collector 3, a framework 4, a track 5 for the locomotive and supporting beams 6.

The center bearing 1 embodies a lower stationary member 7 that is rigidly attached to the supporting beams 6, an upper rotatable member 8 upon which the frame 4 is mounted, conical rollers 9 which are located between the upper and lower bearing members and are pivotally associated with a collar 10 that is mounted upon the lower bearing member 7, and a centrally located pipe 11 which is rigidly attached to the lower bearing member 7 and serves to support portions of the current-collector 3.

The balancing bearings severally comprise wheels 12 that are spaced around the circumference of the turn-table and are mounted on shafts 13, bearings 14 on the turn-table frame 4 for the shafts 13, and an annular rail 15 that is attached to the supporting beams 6 and has a flange 16 the under side of which is engaged by arms 17 of the turn-table frame 4.

The current-collector 3 comprises a set of stationary brushes 18, a set of rotatable collector rings 19, insulating disks 20 separating the rings, a bracket 21 mounted upon a block 22 which is attached to the pipe 11, a support 23 for the brushes 18 which is mounted on the bracket 21, and a shaft 24 to which the collector rings 19 and the disks 20 are rigidly attached, the lower end of the shaft 24 having a bearing 25 in the bracket 21 and having its upper end rigidly attached to a support 26. The current-collector comprises also a cross piece 27 that is rigidly connected to the turn-table and is attached to the support 26 by bolts 28. Leads 29 for connecting the rings 19 to the driving motors (not shown) are carried by the turn-table, and current-supply leads 30 extend through the pipe 11 to the brushes 18. A removable cover 31 is provided for the collector rings and brushes.

The center of the current-collector 3 is placed at the axis of rotation of the turn-table to permit the brushes 18, which are mounted on the lower bearing member 7, to remain stationary, and the rings 19, which are mounted on the rotatable bearing member 8, to rotate in constant contact with the brushes 18. The coincidence of the center of the current-collector with the center of rotation of the turn-table also permits the conductors 30 to extend through the axis of the center bearing, which would otherwise be impossible.

The center bearing 1 is adapted to support the weight of the turn-table and to permit it to rotate, while the balancing bearing 2 and the arms 17, which engage the flange 16, serve to hold the turn-table in a normal position upon the center bearing. The conical rollers 9 of the bearing 1 permit free movement of the upper member 8 relative to the lower member 7.

In the drawing, the current-collector is illustrated as having three sets of collector brushes and rings for use in a three-phase system but such structure is not material to my invention and may be changed to suit the system in which it is used.

Various modifications in the structural details of the turn-table may be effected without departing from the spirit and scope of my invention, and I desire, therefore, that only such limitations shall be imposed as are indicated in the appended claims.

I claim as my invention:

1. In an electrically operated turn-table, the combination with a center bearing including a lower stationary member and an upper rotatable member, of a current-collector including stationary parts and rotatable parts, the stationary parts being mounted upon the lower member of the center bearing and the rotatable parts being mounted upon its upper member.

2. In an electrically operated turn-table, the combination with a center bearing, of a current-collector located above said bearing, and current-supply conductors for the current-collector extending through said bearing.

3. In an electrically operated turn-table, the combination with a center bearing, of a current-collector mounted upon said bearing, and current-supplying conductors for the current-collector extending substantially through the center of said bearing.

4. In an electrically operated turn-table, the combination with a center bearing, of a current-collector mounted upon said bearing and placed within the turn-table, and a cover for the current-collector.

5. In an electrically operated turn-table, the combination with a center bearing including a lower stationary member and an upper rotatable member, of a current-collector comprising rings mounted on the lower bearing member and brushes mounted on the upper bearing member.

6. In an electrically operated turn-table, the combination with a center bearing including a lower stationary member having an opening through its center, and an upper rotatable member having an opening through its center in alinement with the opening in the lower member, of a current-collector mounted above the center bearing including coöperating stationary parts and rotatable parts, the stationary parts being mounted on the lower member of the center bearing and the rotatable parts being mounted on the upper member thereof, and current-supply conductors for the current-collector extending through the openings in the two center-bearing members.

In testimony whereof, I have hereunto subscribed my name this 25th day of Sept., 1915.

HENRY K. HARDCASTLE.

Copies of this patent may be obtained for five cents each, by addressing the "Commissioner of Patents, Washington, D. C."